(12) United States Patent
Romani et al.

(10) Patent No.: US 6,935,840 B2
(45) Date of Patent: Aug. 30, 2005

(54) LOW CYCLE FATIGUE LIFE (LCF) IMPELLER DESIGN CONCEPT

(75) Inventors: Giuseppe Romani, Mississauga (CA); Paul Stone, Guelph (CA)

(73) Assignee: Pratt & Whitney Canada Corp., Longueuil (CA)

( * ) Notice: Subject to any disclaimer, the term of this patent is extended or adjusted under 35 U.S.C. 154(b) by 304 days.

(21) Appl. No.: 10/193,916

(22) Filed: Jul. 15, 2002

(65) Prior Publication Data

US 2004/0009060 A1 Jan. 15, 2004

(51) Int. Cl.$^7$ .................................................. F01D 5/08
(52) U.S. Cl. .......................................... 416/95; 415/177
(58) Field of Search ............................ 415/62, 66, 143, 415/177, 178; 416/95

(56) References Cited

U.S. PATENT DOCUMENTS

| | | | |
|---|---|---|---|
| 3,904,312 A | 9/1975 | Exley | |
| 4,177,638 A | 12/1979 | Wood | |
| 4,251,183 A | 2/1981 | Liu et al. | |
| 4,344,737 A | 8/1982 | Liu | |
| 4,529,452 A | 7/1985 | Walker | |
| 4,653,976 A | 3/1987 | Blair et al. | |
| 4,659,288 A | 4/1987 | Clark et al. | |
| 4,787,821 A | 11/1988 | Cruse et al. | |
| 4,793,772 A * | 12/1988 | Zaehring et al. | 416/95 |
| 4,907,947 A | 3/1990 | Hoppin, III | |
| 5,061,154 A | 10/1991 | Kington | |
| 5,161,945 A * | 11/1992 | Clevenger et al. | 415/177 |
| 6,155,780 A | 12/2000 | Rouse | |
| 6,276,896 B1 | 8/2001 | Burge et al. | |

FOREIGN PATENT DOCUMENTS

DE 31 51 869 A 7/1983

* cited by examiner

Primary Examiner—Ninh H. Nguyen
(74) Attorney, Agent, or Firm—Ogilvy Renault

(57) ABSTRACT

A rotor assembly for a gas turbine engine, having a rotor member with axially spaced-apart front and rear end portions. A thermal shield is located axially downstream of the rear end portion of the rotor for thermally shielding the same from the hot surrounding environment. The thermal shield includes a rear coverplate and an axial gap between the rear coverplate and the rear end portion of the rotor member.

6 Claims, 2 Drawing Sheets

LOW CYCLE FATIGUE LIFE (LCF) IMPELLER DESIGN CONCEPT

BACKGROUND OF THE INVENTION

1. Field of the Invention

The present invention generally relates to gas turbine engines and, more particularly, to rotor members for such gas turbine engines.

2. Description of the Prior Art

At present, most of the world's small aircraft gas turbine engines incorporate a multi-stage titanium compressor. Typically, the first stages are axial compressors and the last stage is a one-piece centrifugal impeller. Typical compressor delivery temperatures are around 850° F. (at the tip of the impeller) and the bore air temperature is around 600° F. The resulting delta T between the two locations is roughly 250° F. With this delta T, the industry has been able to achieve adequate low cycle fatigue (LCF) lives.

Recent demands to improve the engine fuel consumption have resulted in the compressor delivery temperature increasing to 1000° F. and greater. Unfortunately, this high compressor delivery temperature creates high temperature regions on the rear cavity of the impeller. Titanium, at these high temperatures, suffers from creep/fatigue interaction as well as oxidation problems which lowers the LCF life to an unacceptable value.

Accordingly, it has been proposed to replace the titanium impeller with a nickel impeller that does not suffer from the creep/fatigue and oxidation issues at these temperatures. However, the physical properties of nickel, with the presence of the delta T in excess of 400° F., results in an LCF which is again commercially not viable.

SUMMARY OF THE INVENTION

It is therefore an aim of the present invention to improve the LCF life of an impeller subjected to high compressor delivery temperatures.

It is also an aim of the present invention to extend the useful life of a rotor member of a gas turbine engine.

Therefore, in accordance with the present invention, there is provided a rotor assembly for a gas turbine engine, comprising a rotor member having axially spaced-apart front and rear end portions, and a thermal shield located axially downstream of the rear end portion for thermally shielding the rear end portion from a hot surrounding environment. The thermal shield includes a rear coverplate and an axial gap between the rear coverplate and the rear end portion of the rotor member.

In accordance with a further general aspect of the present invention, there is provided a gas turbine engine comprising a compressor, a combustor section, the compressor including an impeller having a hub and a plurality of circumferentially spaced-apart blades projecting radially outwardly from said hub, a shroud surrounding said impeller, and a rear coverplate provided downstream of said impeller and axially spaced therefrom by a dead space such as to lower the heat transfer coefficient at a rear end of said impeller.

In accordance with a still further general aspect of the present invention, there is provided a device for improving the low cycle fatigue (LCF) life of a gas turbine engine impeller having axially spaced-apart front and rear end portions, the device comprising a rear coverplate adapted to be mounted downstream of an impeller at an axial distance of a radially extending rear facing surface thereof so as to define a dead space acting as a heat shielding cavity to protect the impeller.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
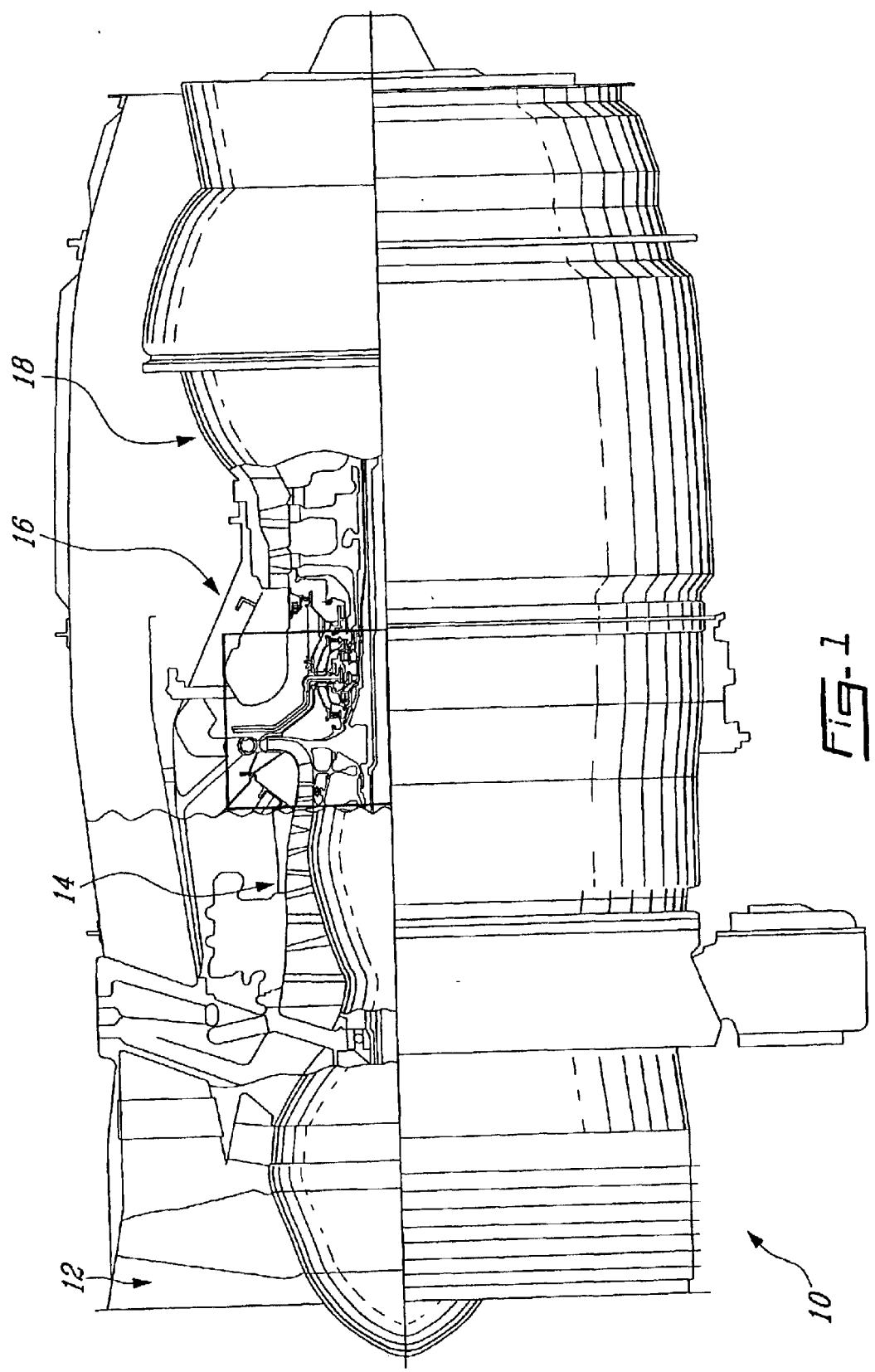
FIG. 1 is a side view of a gas turbine engine broken away to show various sections thereof in accordance with a preferred embodiment of the present invention.

FIG. 1 illustrates a gas turbine engine 10 generally comprising in serial flow communication a fan 12 through which ambient air is propelled, a multistage compressor 14 for pressurizing the air, a combustor 16 in which the compressed air is mixed with fuel and ignited for generating hot combustion gases, and a turbine 18 for extracting energy from the combustion gases.

Figure 2:
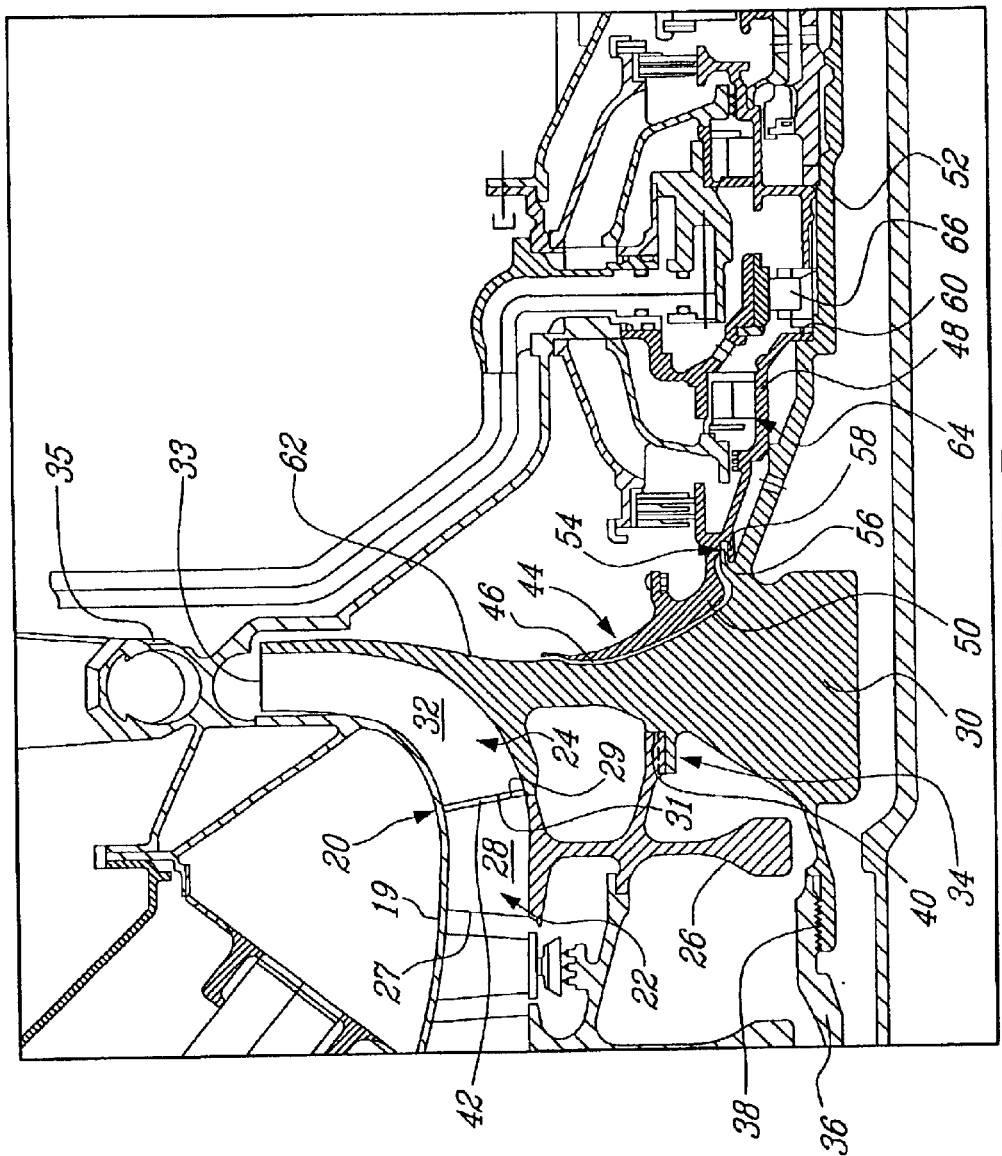
FIG. 2 is an enlarged cross-sectional side view of an impeller forming part of the compressor section of the gas turbine engine shown in FIG. 1.

As shown in FIG. 2, the multistage compressor 14 includes among others a shroud 19 surrounding a two-piece impeller 20 including an inducer 22 and a separate exducer 24. The inducer 22 includes a hub structure 26 and a set of circumferentially spaced-apart blades 28 (only one of which is visible in FIG. 2) extending radially outwardly from the hub structure 26. Each blade 28 extends from a leading edge 27 to a trailing edge 29. The inducer blades 28 have mostly axial flow characteristics. The exducer 24 includes a hub structure 30 and a set of circumferentially spaced-apart curved blades (only one of which is visible in FIG. 2) 32 extending radially outwardly from the hub structure 30. Each curved blade 32 extends from a leading edge 31 to a discharge edge 33 or tip. The curved blades 32 define a radial flow region in which the axial flow of air leaving the inducer blades 28 is diverted generally radially outwardly away from the axis of rotation of the impeller 20 into a diffuser 35. The exducer blades 32 match the inducer blades 28 in number and are adapted to be placed in alignment therewith so as to form a series of circumferentially spaced-apart split blades having an axial flow inducer section followed by a separate centrifugal exducer section.

As shown in FIG. 2, the inducer hub structure 26 and the exducer hub structure 30 are attached together in frictional driving engagement by means of a conventional spigot fit arrangement 34. The inducer and the exducer hub structures 26 and 30 could also be connected in rotational driving engagement by radial face splines or other non-bolted connections, such as rabbets. A front nut (not shown) is threadably engaged on a front tie bolt 36 (a hollow substantially cylindrical member) which is, in turn, threadably engaged at 38 to the exducer 24 to clamp the compressor rotor, including the inducer 22, to the exducer 24. A front clamping face 40 is provided on the exducer 24 to ensure proper axial positioning of the inducer 22 relative to the exducer 24. Each exducer blade 32 extends from a location slightly spaced from the trailing edge 29 of a corresponding inducer blade 28 so as to define a gap 42 once the inducer 22 and the exducer 24 have been axially clamped together. The gap 42 avoids problems associated with the parts coming in contact and fretting or wearing.

The benefits of the above-described split design of the impeller 20, wherein the inducer 22 and the exducer 24 are not rigidly connected to each other but rather solely maintained in rotational driving engagement by axial clamping, include: reduced bore centrifugal stresses, reduced thermal stresses, and reduced impeller weight.

During operation, air is received at the leading edge 27 of the inducer 22 and conveyed axially to the leading edge 31 of the exducer 24 before being directed radially outwardly to be discharged at the discharge edge 33 of the exducer 24. The air received at the leading edge 27 may be at a temperature of about 600 degrees Fahrenheit while the air discharged at the tip of the impeller 20 may be at about 1000 degrees Fahrenheit. The air between the impeller 20 and the combustor 16 of the gas turbine engine 10 can reach even higher temperature.

In order to improve the LCF life of the impeller 20, the exducer 24 can be made out of a material having comparatively higher creep rupture strength at elevated temperatures. For instance, according to a preferred embodiment of the present invention, the inducer 22 is made out of a titanium alloy having comparatively higher tensile strength while the exducer 24 can be made out of a titanium alloy having superior low cycle fatigue resistance at elevated temperatures or, alternatively, out of a nickel alloy.

To prevent the impeller 20 from being negatively affected by the elevated surrounding temperature, it is also contemplated to thermally shield the rear facing side or the back side of the exducer 24 by mounting a rotating rear coverplate 44 at a slight axial distance downstream of the exducer 24 so as to define a rotating dead space 46 between the exducer 24 and the rear coverplate 44. The dead space 46 advantageously contributes to lower the heat transfer coefficient at the rear of the impeller 20, thereby increasing its service life.

The rear coverplate 44 is provided in the form of a hollow tubular sleeve member having an axially extending portion 48 and a front end portion 50 flaring radially outwardly from the axially extending portion 48. The rear coverplate 44 is fitted about a rear hollow tie bolt 52 extending integrally rearwardly from the exducer 24 and on which the turbine discs (not shown) of the turbine 18 are mounted behind the rear coverplate 44. A rear nut (not shown) is threadably engaged on the rear tie bolt 52 to axially clamp the coverplate 44 and the turbine discs to the exducer 24. A spigot fit 54 is provided to ensure proper positioning of the rear coverplate 44 relative to the exducer 24. The spigot fit 54 is provided in the form of a rearwardly projecting annular lip 56 on the exducer 24 and an annular socket 58 in the inner surface of the front-end portion 50 of the rear coverplate 44. A rear clamping face 60 is also provided on the exducer 24 to cooperate with the spigot fit 54 to ensure the integrity of the dead space 46 defined between the rear facing surface 62 of the impeller 20 and the front flaring portion 50 of the rear coverplate 44. The dead space 46 has an annular configuration and extends continuously about the central axis of the gas turbine engine 10 between the exducer 24 and the front flaring portion 50 of the rear coverplate 44. As such, the heat transfer coefficient, which is typically on the order of 300 to 400, reduces approximately to 5. Even though the above-described thermal shield (i.e. the rear coverplate and the dead space) does not totally shield the secondary air from reaching the exducer 24, the low heat transfer coefficient keeps the metal temperature at the rear cavity of the impeller 20 relatively low. This advantageously allows a titanium exducer to be used when the compressor delivery temperature is around 1000° F., while allowing a nickel exducer to be used at temperature exceeding 1000° F.

As shown in FIG. 2, seal runners 64 and bearings 66 can be integrated to the rear coverplate 44. According to a preferred embodiment of the present invention, the rear coverplate 44 is made out of nickel but it is understood that it could be made of other materials exhibiting superior mechanical properties at elevated temperatures.

What is claimed is:

1. A rotor assembly for a gas turbine engine, comprising a rotor member having a hub with axially spaced-apart front and rear end portions, and a thermal shield located axially downstream of said rear end portion for thermally shielding said rear end portion of said hub from a hot surrounding environment, said thermal shield including a rear coverplate and an axial gap between said rear coverplate and said rear end portion of said hub, said rear coverplate being spaced radially inwardly from a radial outermost tip of said rotor member; wherein said axial gap has an annular configuration and extends substantially continuously about the axis of the engine.

2. A rotor assembly as defined in claim 1, wherein said rear coverplate is detachably mounted to said rotor member.

3. A rotor assembly as defined in claim 1, wherein said rear coverplate is mounted for joint rotation with said rotor member about a common central axis.

4. A rotor assembly as defined in claim 1, wherein a spigot fit is provided between said rotor member and said rear coverplate to ensure the integrity of said axial gap when the rotor member and the rear coverplate are axially clamped together.

5. A rotor assembly as defined in claim 1, wherein said rear coverplate has a hollow sleeve configuration with an axially extending tubular portion extending rearwardly from a radially flaring tubular front portion.

6. A rotor assembly as defined in claim 5, wherein said axial gap includes a continuous dead space formed between a radially extending rear surface of said rear end portion of said hub and said radially flaring front portion of said rear coverplate.

* * * * *